(12) United States Patent
Blackstein et al.

(10) Patent No.: US 11,138,018 B2
(45) Date of Patent: Oct. 5, 2021

(54) OPTIMIZING EXECUTION OF COMPUTER PROGRAMS USING PIECEMEAL PROFILES

(71) Applicant: Nvidia Corporation, Santa Clara, CA (US)

(72) Inventors: Marc Blackstein, Santa Clara, CA (US); Ram Rangan, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 51 days.

(21) Appl. No.: 16/221,106

(22) Filed: Dec. 14, 2018

(65) Prior Publication Data

US 2020/0192680 A1 Jun. 18, 2020

(51) Int. Cl.
*G06F 8/65* (2018.01)
*G06F 8/41* (2018.01)
*G06F 9/445* (2018.01)
*G06F 9/455* (2018.01)

(52) U.S. Cl.
CPC .......... *G06F 9/44505* (2013.01); *G06F 8/443* (2013.01); *G06F 8/65* (2013.01); *G06F 9/45516* (2013.01)

(58) Field of Classification Search
CPC .... G06F 9/44505; G06F 8/65; G06F 9/45516; G06F 8/443; G06F 9/4411
See application file for complete search history.

(56) References Cited

U.S. PATENT DOCUMENTS

| 6,502,237 | B1 | 12/2002 | Yates et al. |
| 7,809,936 | B2 | 10/2010 | Einloth et al. |
| 8,006,235 | B2 | 8/2011 | Broman et al. |
| 8,635,606 | B2 | 1/2014 | Kruglick |
| 9,134,980 | B1 | 9/2015 | Cabrera et al. |

(Continued)

FOREIGN PATENT DOCUMENTS

| EP | 1897322 A2 | 3/2008 |
| EP | 2413257 B1 | 4/2017 |

(Continued)

OTHER PUBLICATIONS

Liska; "Optimizing large applications"; Master Thesis; Charles University in Prague Faculty of Mathematics and Physics; Mar. 27, 2014; 84 pgs.

(Continued)

*Primary Examiner* — Daxin Wu (57) ABSTRACT

Profile-guided optimization is a technique for optimizing execution of computer programs using profile information to improve program runtime performance. Obtaining the profile information can be challenging, especially in live production environments such as high-performance gaming systems. A profiling strategy is provided herein that obtains profile information without requiring extra effort from users. The profiling strategy collects several approximate, lightweight profiles called piecemeal profiles over one or more lifetimes of a computer program, or application. The piecemeal profiles are then used to generate whole program application profiles that can then be used to improve the execution of the application. A piecemeal profile is profile information of a section or portion of an application.

24 Claims, 5 Drawing Sheets

(56) References Cited

U.S. PATENT DOCUMENTS

| | | | |
|---|---|---|---|
| 9,348,566 B1* | 5/2016 | Moseley | G06F 11/34 |
| 9,451,573 B2* | 9/2016 | Erickson | H04L 61/6059 |
| 9,569,342 B2 | 2/2017 | Bijanki et al. | |
| 9,575,778 B2 | 2/2017 | Chen et al. | |
| 9,996,325 B2 | 6/2018 | Lim et al. | |
| 2010/0125838 A1* | 5/2010 | Kuusilinna | G06F 8/443 |
| | | | 717/158 |
| 2011/0106527 A1 | 5/2011 | Chiu | |
| 2012/0278793 A1* | 11/2012 | Jalan | G06F 11/3419 |
| | | | 717/158 |
| 2013/0167127 A1* | 6/2013 | Gu | H04L 29/08135 |
| | | | 717/140 |
| 2014/0047425 A1* | 2/2014 | Thapar | G06F 8/656 |
| | | | 717/168 |
| 2014/0181591 A1* | 6/2014 | Bijanki | G06F 9/4552 |
| | | | 714/38.1 |
| 2014/0258997 A1* | 9/2014 | Lim | G06F 8/443 |
| | | | 717/151 |
| 2015/0347103 A1* | 12/2015 | Mahaffey | G06F 8/443 |
| | | | 717/153 |
| 2016/0004518 A1* | 1/2016 | Sharma | G06F 8/443 |
| | | | 717/157 |
| 2016/0246647 A1* | 8/2016 | Harris | G06F 9/5027 |
| 2017/0131983 A1 | 5/2017 | Roytman et al. | |
| 2018/0046497 A1* | 2/2018 | Al-Jarro | G06F 11/3409 |
| 2018/0137039 A1* | 5/2018 | Kielstra | G06F 8/443 |
| 2018/0189040 A1* | 7/2018 | Sasanka | G06F 8/4442 |
| 2018/0246762 A1* | 8/2018 | Tarsa | G06F 9/5083 |
| 2019/0042433 A1* | 2/2019 | Porpodas | G06F 8/41 |

FOREIGN PATENT DOCUMENTS

| | | |
|---|---|---|
| EP | 3278218 A1 | 2/2018 |
| GB | 2487181 A | 7/2012 |

OTHER PUBLICATIONS

Bowman, et al.; "Profile-Guided Meta-Programming"; Northeastern Univeristy and Cisco Systems, Inc.; Jan. 3, 2017; 10 pgs.

Rajagopalan, et al.; "Profile-Directed Optimization of Event-Based Programs"; University of Arizona and AT&T Labs-Research; Undated; 10 pgs.

* cited by examiner

OPTIMIZING EXECUTION OF COMPUTER PROGRAMS USING PIECEMEAL PROFILES

TECHNICAL FIELD

This application is directed, in general, to optimizations of computer programs by compilers or driver software, and more specifically, to profile-guided optimizations (PGOs) by compilers or driver software in live, high-performance environments such as computer gaming systems.

BACKGROUND

PGO is a technique for optimizing execution of computer programs, whereby compilers or drivers use profile information to improve program runtime performance. PGO relies on profile information to effect beneficial computer program transformations and/or change hardware performance settings. The transformations and changes are typically implemented at the user's computing device. Performance improvements through PGO have been demonstrated in various applications, typically by obtaining profile information from one or more prior unoptimized runs of the targeted programs in non-production environments. Obtaining profile information in live production environments, such as high-performance gaming systems, can be very challenging due to the performance overhead of profiling.

SUMMARY

In one aspect, the disclosure provides a method of enabling profile-guided optimizations. In one embodiment, the method includes: (1) receiving piecemeal profiles of a whole program profile for an application, wherein the piecemeal profiles are from on-line profiling of an application on a user computing device while executing the application, (2) constructing the whole program profile by combining the piecemeal profiles, and (3) determining profile-guided optimization opportunities for the user computing device from the whole program profile.

In another aspect, the disclosure provides a piecemeal profiling system. In one embodiment, the piecemeal profiling system includes: (1) a piecemeal profiler on a user computing device that is configured to obtain piecemeal profiles of a whole program profile for an application executing on the user computing devices, (2) an application profiler configured to receive the piecemeal profiles, construct the whole program profile based on the piecemeal profiles, and determine profile-guided optimization opportunities by analyzing the whole program profile, and (3) a profile-guided optimization (PGO) optimizer on the user computing device that is configured to receive the profile-guided optimization opportunities from the application profiler and implement changes to the application or hardware settings of the user computing device based on the profile-guided optimization opportunities.

In yet another aspect, the disclosure provides a profile-quided optimization server. In one embodiment the profile-quided optimization server includes: (1) a communications interface configured to receive and transmit data via a communications system, and (2) a processor configured to receive piecemeal profiles of applications via the communications interface, construct a whole program profile for each of the applications based on the corresponding piecemeal profiles, and determine profile-guided optimization opportunities for each of the applications by analyzing each of the whole program profiles.

BRIEF DESCRIPTION

Reference is now made to the following descriptions taken in conjunction with the accompanying drawings, in which.

DETAILED DESCRIPTION

The profile information provides feedback from the execution of a program that is then used to generate better code for future execution of the program on a computer. The profile information can also provide feedback that is used to optimize performance settings for hardware components of the computer during the execution of the program. Providing these optimizations from the profile information can greatly increase a user's experience when using the program. The difficulty, however, is in initially obtaining the profile information without interfering with a user's experience. For example, profiling during game play can be especially difficult due to user interaction while playing a game. This difficulty, which can be traced to the absence of effective, low-overhead profile collection mechanisms, has had a chilling effect on productizing PGO and applying it to applications such as live gaming environments.

Profiling can be generically classified into two types, offline and online, both of which have certain undesirable properties when applied naively that make them unsuitable for some applications. Using gaming environments as an example, offline profiling on user systems requires users to attempt a dry run of a game or its benchmark, at significant performance overhead and often at unplayable speeds, just to collect whole program profile information. Making this demand of gamers for every game they play will likely ruin their experience. Offline profiling by an operator of a gaming system for select whitelisted titles can avoid the above user-experience problem, but cannot be done for all titles and thus is not enough to guarantee good general out-of-the-box performance. Online profiling during game-play can eliminate both the above problems, but can hurt gaming experience by causing poor frame rates and/or occasional stuttering due to profiling overhead.

As such, included herein is a profiling strategy that has a low overhead, that works out-of-the-box, and that doesn't require any extra effort from a user. Instead of highly-accurate, but heavy-duty profile collection in a single pass for an application, the disclosure provides several approximate, lightweight profiles called piecemeal profiles over one or more lifetimes of an application, which are then used to generate whole program application profiles. A piecemeal profile is profile information of a section or portion of an application; a partial profile of the application's profile information that is a subset of the application's whole program profile, wherein the piecemeal profiles are aggregated to generate the whole program profile for the application. The piecemeal profile can be a subset of the multiple regions (e.g. instructions, function calls, etc.) of the application. Piecemeal profiles can be obtained from a single computing device across frames of an application. The piecemeal profiles can be from a limited amount of profile information collected per frame, from randomly selected subsets of targeted regions of a frame, from profile information collected at a random or periodic sampling of the frames, such as only one out of N frames, different profile information collected per frame or at particular frames, or any combination thereof. Additionally, instead of at one computing device, the piecemeal profiles for an application can be collected across geographically separated computing devices and then aggregated to generate a whole program profile.

While the piecemeal aspect allows for low overhead profiling, careful aggregation of piecemeal profiles ensures that whole program profiles are accurate enough for PGO purposes. PGO opportunities can then be determined based on such profiles and sent to the computing devices for profile-guided optimizations. The profile-guided optimization (PGO) opportunities for an application are recognized improvements determined from the whole program profile for optimizing execution of the application on the particular computing device. PGO opportunities include code transformations for the application, changes in hardware performance settings for the user computing device, or a combination of both.

Piecemeal profiling as disclosed herein improves the collection of profile information that results in an improvement in optimization for applications running on computing devices. The improved collection of profile information can include associating the piecemeal profiles with context information from the application that allows directed optimization of particular parts or portions of an application. For example, the application can be a game application and the context information can indicate that the associated piecemeal profile information corresponds to a specific user level. The resulting PGO opportunities can then be used for the specific user level and not implemented in other user levels of the game application.

The optimization benefits from the piecemeal collection strategy can vary depending on the computing devices in which the PGO opportunities are employed for executing the applications. Considering game applications as an example, in non-power constrained environments, gamers crave the highest possible frame rate out of game experience because this provides quality and gives them an edge in gaming. Optimizations from the piecemeal profiles can be used in this environment to improve the quality of the game and improve the user's experience. In power-constrained environments, such as a notebook computer, a power budget is typically fixed or a performance target is locked, for example, at 60 frames per second (fps). Optimizations from the piecemeal profiles can be used on the notebook to increase the generation speed of the 60 fps to allow more processor downtime and save battery power. In virtual reality (VR) environments, the best user's experience occurs when there is a consistent frame rate of 90 Hz. If not delivering game rendering at 90 Hz, there can be dropped frames and the VR system will try to accommodate. Optimizations from the piecemeal profiles can improve performance to provide a more stable VR experience. The performance profile of an application in a VR environment can even be user specific and detect per-user patterns such as body quirks, head motion, etc. As such, optimizations from the piecemeal profiles can be optimizing for specific users based on their user patterns.

An example of optimization from piecemeal profiling resulting in improved performance includes profiling that identifies a certain register R2 having a value of zero fifty percent of the time. Another register, register R1, is a result of an expensive texture lookup operation that gets multiplied by the value of the register R2 to determine the value of register R0. Before optimization, the multiplication of R1 is executed regardless of the value of R2. But through piecemeal profiling, it is known that there is a high probability that the value of register R2 is zero, and if such then the value of the register R1 does not matter. A PGO opportunity can then be recognized from the profile information wherein the application code is rewritten so that if R2 is zero, then the expensive texture lookup for register R1 is not performed. Thus, if register R2 is not zero, then the texture operation is performed to determine the value of register R1 for multiplication by R2; otherwise register R0 is set to zero. The rewriting can occur automatically in the compiler to provide improved performance.

Figure 1:
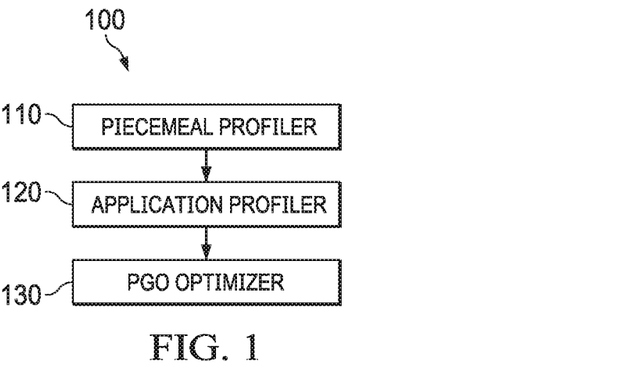
FIG. 1 illustrates a block diagram of a piecemeal profiling system (PPS) constructed according to the principles of the disclosure.

Turning now to the Figures, FIG. 1 illustrates a block diagram of a piecemeal profiling system (PPS) 100 constructed according to the principles of the disclosure. The PPS 100 includes a piecemeal profiler 110, an application profiler 120, and a profile-guided optimization (PGO) optimizer 130. The PPS 100 can be implemented on a single computing device or can be a distributed PPS (DPPS) having at least some elements that are distributed across multiple computing devices and a server. For example, the piecemeal profiler 110 and the PGO optimizer 130 can be distributed across multiple computing devices and the application profiler 120 can be part of a PGO server that is communicatively coupled to the multiple computing devices.

The piecemeal profiler 110 is configured to obtain piecemeal profiles of a whole program profile of an application during execution or running of the application. The piecemeal profiler 110 can be located on a user computing device and obtain the piecemeal profiles while the application is executing on the computing device.

The application profiler 120 is configured to receive the piecemeal profiles and construct the whole program profile based on the piecemeal profiles. The application profiler 120 is further configured to determine PGO opportunities for the computing device by analyzing the whole program profile.

The PGO optimizer 130 is configured to receive the PGO opportunities from the application profiler 120 and implement changes to optimize execution of the application. The changes for optimization can be, for example, changes to the application code or changes to the hardware settings of the user computing device based on the PGO opportunities or a combination of both. The changes are implemented by the PGO optimizer on the user computing device. In some examples, such as in a gaming environment, the PGO can be a user-mode driver (UMD). The UMD includes a compiler that is invoked when the UMD wants programs compiled. In addition to invoking the compiler, the UMD translates high-level API call sequences to machine-specific sequences. A profile-guided optimization can be effected in various parts of a UMD.

As noted above, the PPS 100 can be deployed in multiple configurations for piecemeal profile collection, piecemeal profile aggregation, and PGO transform generation. The collection, aggregation, and generation can all be performed on a single user computing device. As such, the piecemeal profiler 110, the application profiler 120, and the PGO optimizer 130 can be located on a single computing device. Piecemeal profiling can happen over several frames on the single computing device. Considering a game, in a first frame a portion of the game code can be profiled. In subsequent frames, a different portion of the game code can be profiled until a corpus of information on the single computing device is collected and aggregated for optimization of the computing device. This arrangement can provide out-of-the-box PGO performance for all games and platforms.

In some arrangements, instead of on a user computing device, the piecemeal profile collection can occur on another computing device or devices running the application. For example, the piecemeal profiler 110 can be located on computing devices that are in-house of a manufacturer of the computing device or a processor of the computing device. In this arrangement, the piecemeal profiles can be collected without input from user computing devices. The piecemeal profile aggregation and generation of PGO opportunities can also take place external to the user computing device, such as in a PGO server. The application profiler 120 can then be in the PGO server and the PGO opportunities can be downloaded to the PGO optimizer 130 on user computing devices for implementation. This arrangement eliminates profiling overhead concerns for clients and provides an out-of-the-box PGO performance for profiled games and chip platforms. The on-line, in-house game play can occur before delivery of a game instead of on an end-user computing device. In some examples, quality control teams can be used to play the games and collect performance piecemeal profiles. The collected piecemeal profiles can then be sent to a server for aggregation and downloading to the computing devices for implementation.

Figure 2:
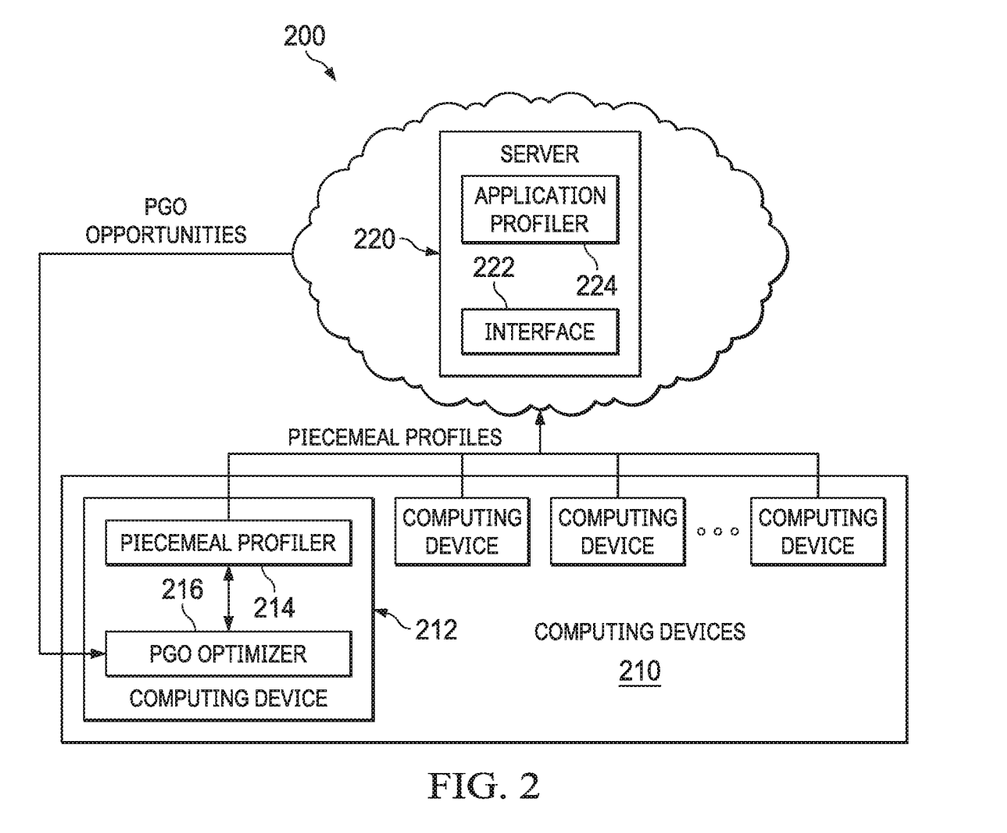
FIG. 2 illustrates a block diagram of an example of a distributed PPS (DPPS) constructed according to the principles of the disclosure.

Another deployment that can work in conjunction with the in-house arrangement, is a DPPS such as shown in FIG. 2. FIG. 2 illustrates a block diagram of an example of a DPPS 200 constructed according to the principles of the disclosure. The DPPS 200 includes piecemeal profilers, an application profiler, and PGO optimizers, that are integrated on client or user computing devices, collectively referred to as computing devices 210, and a server 220. The DPPS 200 provides an improved profiling system wherein profile information for applications is gathered from the user computing devices 210 and provided to the server 220. The server 220 includes a communications interface 220 and an application profiler 224.

The communications interface 222 is communicatively coupled to the application profiler 224 and is configured to receive and transmit data over a communications system. The communications interface 222 can be a conventional interface that is used to communicate over a conventional communications system. The communications interface 222 can receive piecemeal profiles and context information from the computing devices 210 and transmit PGO opportunities from the application profiler 224 to the computing devices 210. The application profiler 224 creates profiling databases per application, obtains confidence/optimizations by analyzing the databases, and sends optimization opportunities to the computing devices 210 for implementation.

The computing devices 210 are electronic devices having at least one processor, data storage or memory, a communications interface, etc., that are capable of executing applications such as disclosed herein. The computing devices can be smartphones, tablets, desktop computers, laptop computers, etc. The computing devices 210 obtain profile information for the executing applications and provide this profile information to the application profiler 224. The computing devices 210 can also provide context information to the application profiler 224 with the profile information. Each of the computing devices 210 includes a piecemeal profiler to obtain the profile information, the context information, and provide these to the application profiler 224. Computing device 212 is used as a representative of the computing devices 210 and will be discussed in more detail. Computing device 212 includes a piecemeal profiler 214 and a PGO optimizer 216.

The piecemeal profiler 214 and the PGO optimizer 216 can both be implemented on a processor of the computing device 212 as a series of operating instructions stored on a non-transitory computer readable medium that directs the operations of the processor when executed. The piecemeal profiler 214 is configured to obtain, via on-line profiling, a piecemeal profile for an application e.g., gaming application, executing on the user computing device 212. The piecemeal profile can be a deterministic or random subset of information that will ultimately constitute the whole program profile of the application. The piecemeal profiler 214 can then, after running the application (e.g., when the application is offline), add context information of the application to the obtained profile information.

The context information can be application data or an application state that corresponds to the profile information. The context information can be generated via smart hashing of the application state. The unique user-specific subset of a whole program profile for the application and the context information is sent via a secure upload to the application profiler 224.

The piecemeal profile can be of a subset of the multiple instructions of the application. The subset can be a region of code of the application. Different clients or client computing devices 210, can be assigned to different subsets of the instructions for profiling. In some examples, multiple clients can be assigned to the same subset. The subset profiled per frame can be explicitly, deterministically determined (i.e., first 5 sites of interest in frame 1, next 5 in frame 2, and so on) or randomly determined. Operands of the instructions of a subset that are profiled can also be determined at random, either statically or dynamically during a profiling run.

For example, the piecemeal profiler 214 can be instrumentation/profiling logic on the computing device 110 that customizes instrumentation to the computing device 212. This is a best-effort exercise that would attempt to introduce tiny amounts of instrumentation to generate piecemeal profiles, across all systems worldwide. Multiple of the computing devices 210 can be used to profile the same regions of code. Or, instrumentation/profiling logic can be customized to each one of the computing devices 210. The application profiler 224 will track how many profiles it received for each instrumentation site and normalize accordingly. Overhead is kept low due to the small number of sites instrumented and profiled. Besides achieving low overhead instrumentation and profiling, the piecemeal profiler 214 will also be responsible for collecting, associating, and transmitting necessary context information to the application profiler 224 along with the actual profile information that is obtained.

The application profiler 224 is integrated on the server 220 wherein the aggregated information is coalesced. In some examples, the server 220 can be a PGO server that keeps drivers up to date and automatically optimizes application settings. The application profiler 224 is configured to receive the piecemeal profiles, construct the whole program profile based on the piecemeal profiles, and determine profile-guided optimization opportunities by analyzing the whole program profile. The server 220 can include a processor or processors that determine optimal settings for an application through the profiling of the computing devices 210 and provide these optimal settings to the computing devices 210. The application profiler 224 can be integrated on the processor or processors. PGO optimizers on each of the computing devices 210 can then modify their configuration files for the application.

The PGO optimizer 216 is configured to receive the profile-guided optimization opportunities from the server 220 via the communications interface 222 and implement changes to the application or hardware settings of the user computing device 212 based on the PGO opportunities. The PGO optimizer 216 receives the profile-guided optimization opportunities along with associated context information from the server 220 and effects appropriate code transforms. The piecemeal profiler 214 and the PGO optimizer 216 can be modules operating on the computer device 212 that are local clients of a cloud-based application. The application can be a graphics program such as a game application. An example of a game application that is cloud-based is GeForce Experience by Nvidia Corporation of Santa Clara, Calif.

Figure 3:
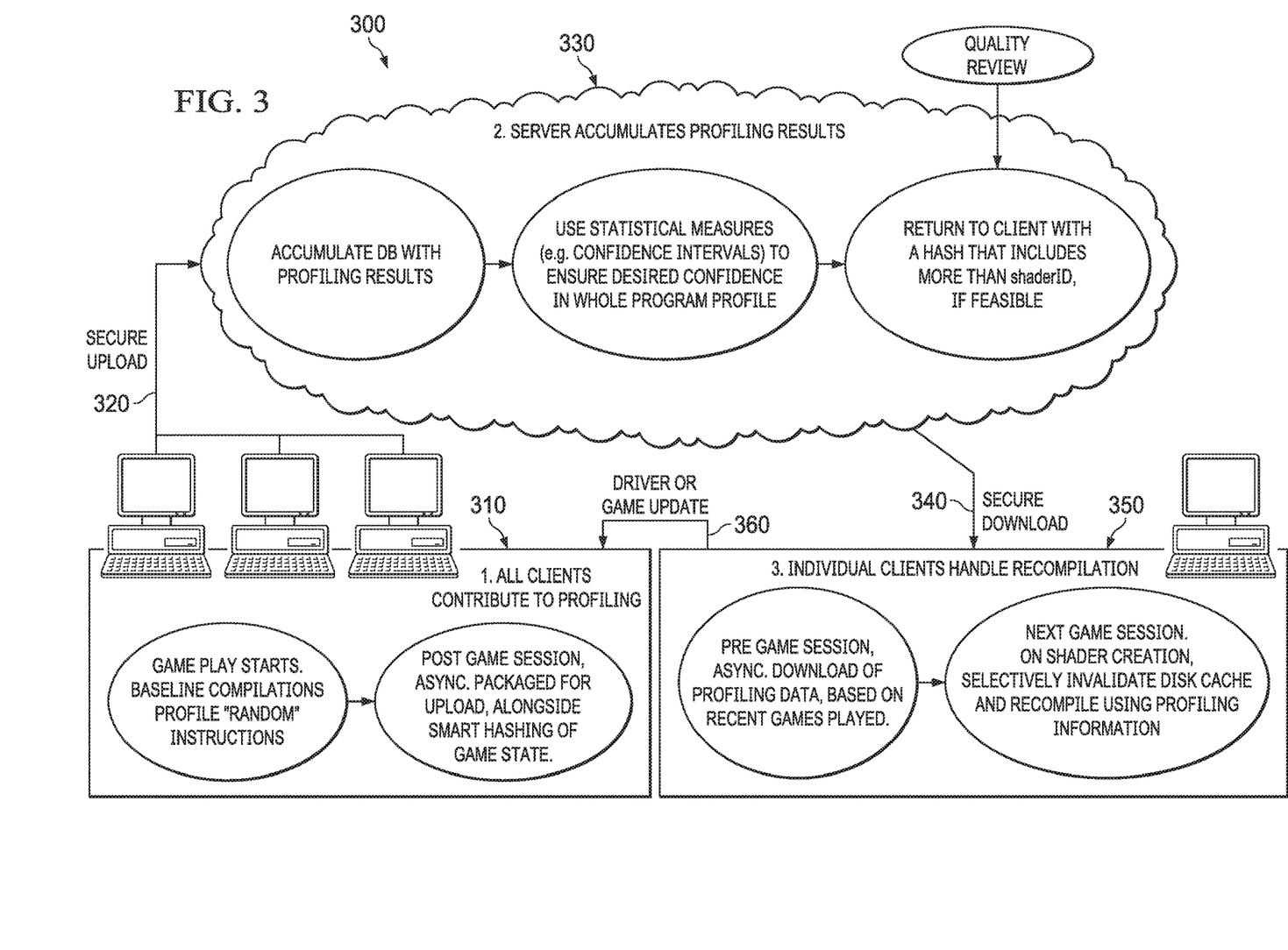
FIG. 3 illustrates a flow diagram of an example of a method carried out according to the principles of the disclosure that demonstrate the distributed piecemeal profiling used with a cloud-based game application.

FIG. 3 illustrates a flow diagram of an example of a method 300 carried out according to the principles of the disclosure that demonstrate the distributed piecemeal profiling used with a cloud-based game application. The method 300 is demonstrated with reference to a DPPS, such as the DPPS 200, that includes a server and computing devices on which the game application is executing. The piecemeal profiling in FIG. 3 focuses on a shader portion of the game as an example. The method 300 begins on the computing devices.

In a step 310, game play starts on the computing devices and piecemeal profiles of the game application are obtained. Obtaining the piecemeal profiles includes obtaining information on-line, i.e., obtaining profile information during execution of the game. Once game play begins, baseline compilations can profile instructions of the game. The instructions chosen for profiling can be a randomly or deterministically determined set of instructions that provide a sampling of the application code. A device-driver development platform, such as a user-mode driver (UMD) or UMD framework (UMDF) can be used to obtain the piecemeal profiles.

After the game session ends, context information that corresponds to the piecemeal profiles is obtained. The post-game session can be performed asynchronously and include packaging of the piecemeal profiles for a secure upload to the server. Asynchronously refers to not interrupting playing of the game such as after the game session ends or occurring in the background without affecting game play. The packaging includes associating the context information to the piecemeal profiles.

The context information is relevant game information that indicates the location and status of the game, or game state, in which a piecemeal profile was obtained. The context information is used since all profile information cannot be coalesced, or should not be coalesced into one profile. The context information allows tailoring the piecemeal profiles for game scenes and for skill levels of the game. With the context information, the piecemeal profiles can be distinguished for certain game states. For example, different users can contribute profile information at different levels within a game. The profile information is tagged with relevant game information (e.g., meta data) to prevent pollution of piecemeal profiles from game level 1 from piecemeal profiles of game level 10. Smart hashing of a game state can be used for the context information.

The piecemeal profiles and the context information are sent to the PGO server in a step 320. The piecemeal profiles and context information can be sent via a secure upload over a conventional communications network.

In a step 330, profile-guided optimization opportunities are determined for the user computing devices. An application profiler on the PGO server can determine the profile-guided optimization opportunities from a whole program profile that is constructed from the piecemeal profiles received from the computing devices. The application profiler receives the piecemeal profiles and generates a database from the piecemeal profiles for the game. A different database for each different game can be generated from piecemeal profiles of each of the games.

A whole program, or application, profile for a game is then created by aggregating the piecemeal profiles from the database. Statistical measures can be used to ensure desired confidence in the whole program profile. The statistical measures include confidence intervals.

The statistical measures or tools can be used to correct variances from piecemeal profiles and allow sampling from some of the population of computing devices running the application to determine how the whole population of computing devices would respond. For example, the piecemeal profiles can include values and multiple values are accumulated. A mean of the values and a variance across values can then be determined and compared to a threshold number. Values can continue to be accumulated until the variance drops below the threshold number. The resulting mean is then likely close to the overall population mean. Other statistical measures of like mode or median can be used as well.

Profile-guided optimization opportunities can then be determined for the user computing devices from the whole program profile. The profile-guided optimization opportunities can be determined via conventional procedures or methods. The profile-guided optimization opportunities are returned to the client computing devices in a step 340.

Step 340 can be via a secure download over a conventional communications network. The server can determine enough profile information has been collected when the profile information is the same or at least similar such that meaningful PGO opportunities can be determined. At this point, the PGO opportunities for the game are ready to be downloaded for the benefit of the users. The download can be asynchronous and occur in the background without interfering with the game. Optimization based on the download can also be done asynchronously and processed in the background.

Step 340 can be controlled based on different distribution factors. For example, optimizations in a GPU, gaming framework typically happens through a driver. This can occur through batch updates that are scheduled once every two to three months by, for example, a manufacturer of the GPU. In between the scheduled driver updates, a new game can be released that does not yet have driver optimizations. Putting optimizations in the cloud allows activating optimization when a game releases instead of waiting until the next schedule update. This allows existing drivers to get the benefit of PGO instead of waiting for the scheduled batch updates. Additionally, if there are any concerns, even game by game, the optimizations can be deactivated per title. Quality assurance teams, for example, may want to suppress particular PGOs for certain applications due to stability or correctness issues associated with those PGOs. If problems occur in the field, for example, downloading of PGO opportunities can be turned off until problems are solved and corrections can be downloaded. This can occur by nullifying optimizations per game or provide dummy information for downloads. Thus, the PGO opportunities can be reviewed for quality before being sent to the computing devices.

Step 340 can also be controlled based on recent games that have been played by the computing devices. As such, PGO opportunities can be strategically downloaded to the computing devices that are most likely to benefit from the optimizations.

The profile-guided optimization opportunities can be returned with the context information in step 340. The context information can include the shader ID and be in the form of a hash. The hash refers to the same smart hash used to gather context information and associated to a specific piecemeal profile in step 310. This allows a driver on a user computing device to decide to use a profile-guided optimization opportunity only when the smart hash matches a computed smart hash dynamically determined during game play. Multiple profile-guided optimization opportunities can be downloaded and a smart hashed downloaded with each one. A driver on the computing devices picks the appropriate profile-guided optimization opportunity based on a scene (smart hash match) in which a user is playing; thus allowing context specific optimization.

In a step 350, the PGO opportunities for the game application are received by the client devices. The PGO opportunities can be downloaded based on recent games played and employed by the computing devices in recompiling the code for the games. Since multiple, different types of platforms can be represented by the computing devices, such as different processors, different processor types including GPUs and CPUs, different drivers, etc., recompiling is advantageously performed at the computing devices. Downloading of the PGO opportunities can be in a pregame session that is asynchronous.

In the next game session on shader creation, the computing device selectively invalidates disk cache and recompiles using the PGO opportunities (i.e., the profiling data). This step can be infrequent and rare. For example, once there is confidence in the PGO opportunities (the profiling data), then synching of profile information and recompiling the code should be rare. Confidence in the profiles can be ensured statistically as noted above in step 330. In some examples, the disk cache can be cleared and PGO opportunities sent for recompiling on a time basis to see if new profile information is available for recompiling. In a step 360, a game update or new driver release then begins the collaborative profile collection stage of 310.

The "piecemeal" part of the FIG. 3 DSSP causes a random subset of the total instrumentation sites in a shader program to be instrumented for each user (e.g., if the profiling objective is to profile all the MUL operations in a program, the piecemeal profiler would instrument only the first 5 MULs for user A, the second 5 MULs for user B, the third 5 MULs for user C, and so on.). Restricting instrumentation to a small region of a shader per user will keep online profiling overhead under control and minimize interference to a user. Further overhead reduction strategies can be applied to make it negligible. For example, the lightweight instrumentation can be made to execute conditionally, say every 100th frame, the profile output surface can be bound only every 100 or so frames to reduce memory traffic, etc. Additionally, most instructions on a GPU execute in a vector or single instruction multiple data (SIMD) fashion, wherein the operation involves reading of one or more arrays of registers or memory locations as source operands and writing of one or more arrays of registers or memory locations as destination operands. Profiling overhead for such instructions can be reduced by selectively profiling only a subset, possibly random, of afore-mentioned array of operands, instead of all of them all the time.

Examples of properties to profile at a shader program level are execution frequencies of various control blocks and operand values of instructions (input and output operands). At the API level, profile properties include counts of vertices, primitives (shapes drawn), and pixels in draw calls. Additional examples of profile properties include the frequency a given draw call is skipped in a frame and the frequency a buffer is updated during a frame.

The "distributed" part of the solution then combines the piecemeal profiles from individual users in the PGO server, constructs a whole program profile, analyzes the whole program profile for interesting PGO opportunities, and conveys that information back to user computing devices to enable the local driver to perform relevant PGO transformations. The piecemeal and distributed solution helps overcome the drawbacks of traditional online and offline profiling approaches and provides an improved system.

Figure 4A:
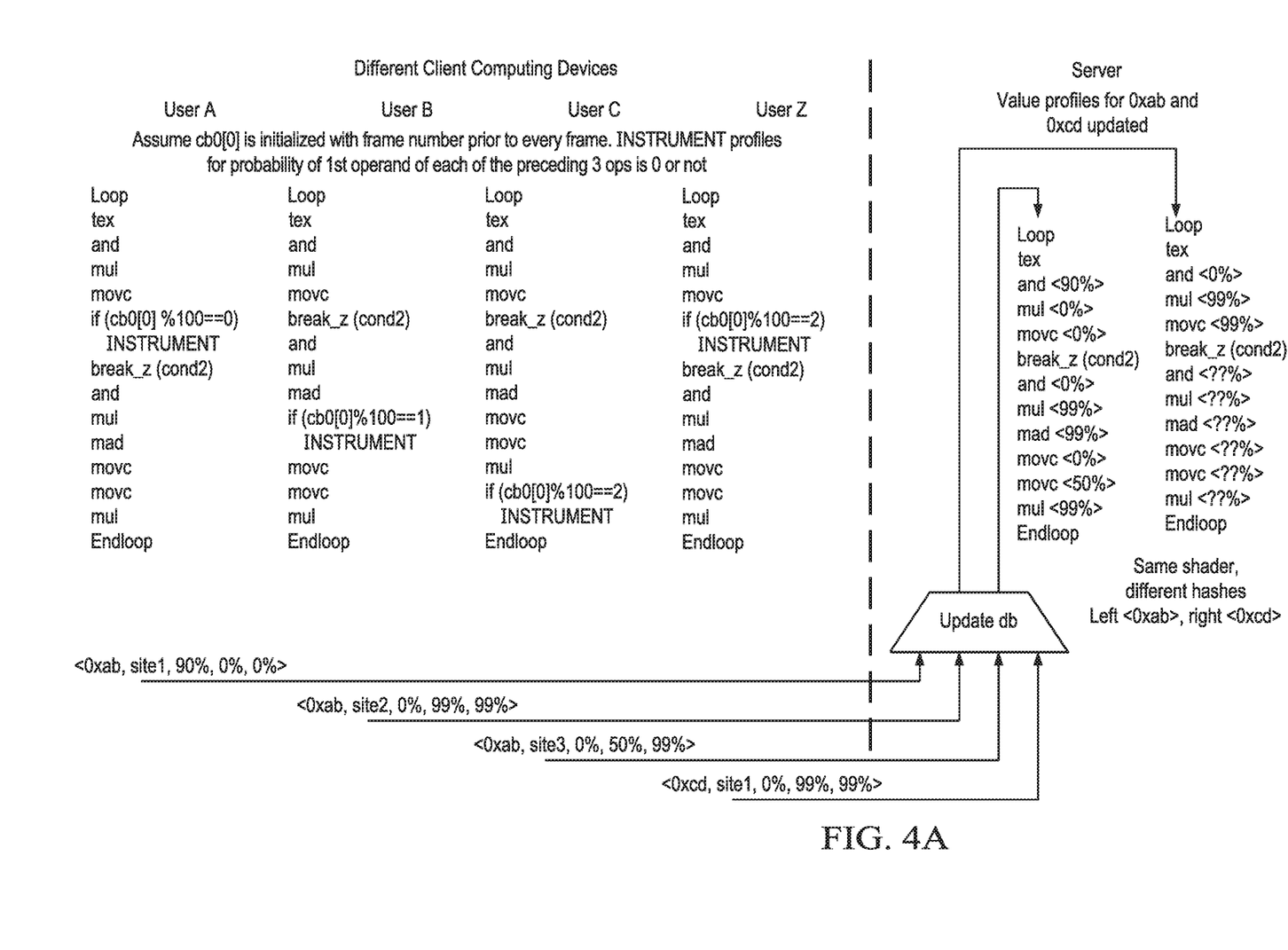
FIG. 4A and FIG. 4B illustrate examples of piecemeal profiling from multiple client computing devices designated as Users A, B, C, and Z.
Figure 4B:
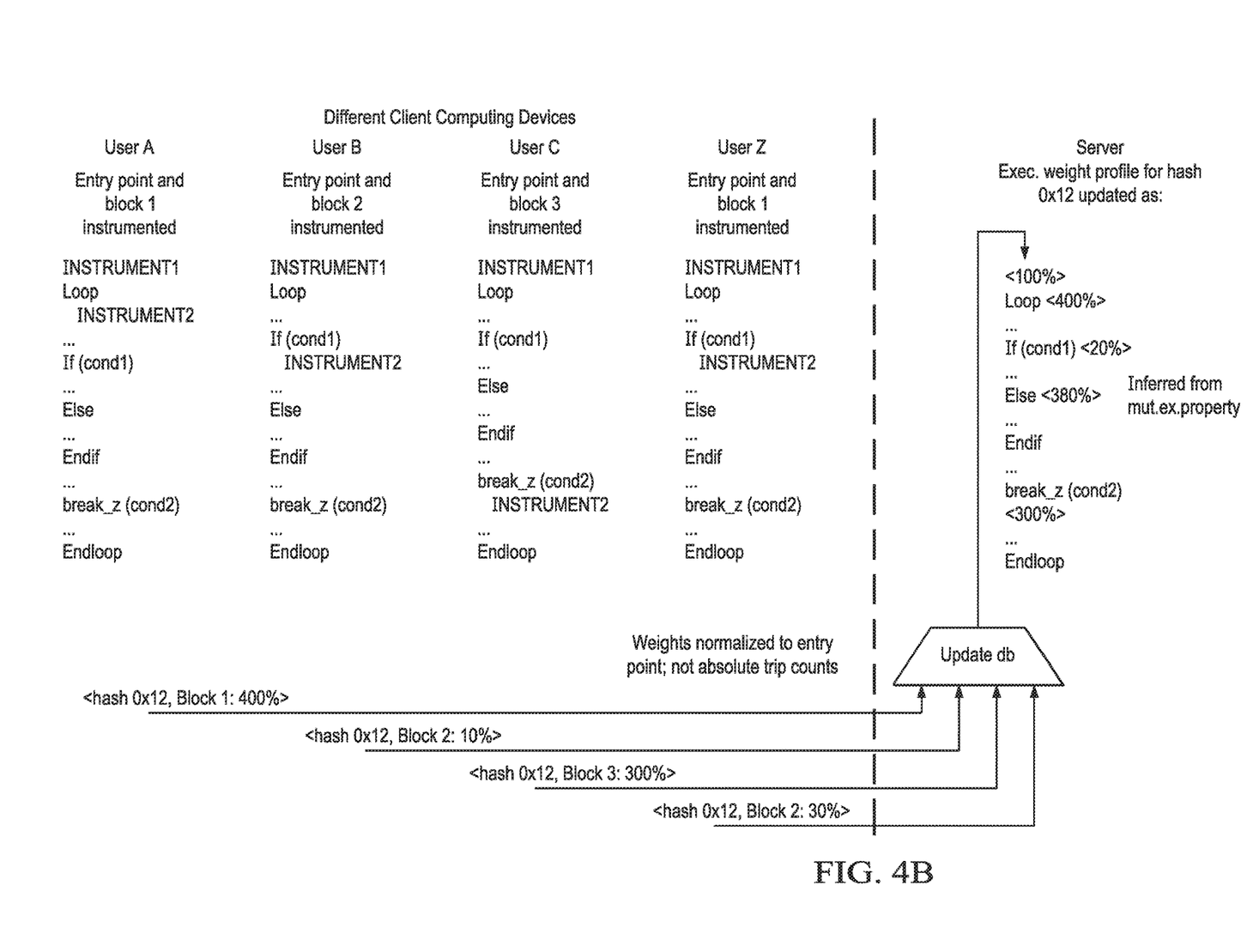

FIG. 4A and FIG. 4B illustrate examples of piecemeal profiling from multiple client computing devices designated as Users A, B, C, and Z. In both FIG. 4A and FIG. 4B, the collected piecemeal profiles are uploaded to a PGO server. The PGO server can include an application profiler as disclosed herein that receives piecemeal profiles, constructs a whole program profile based thereon, and determines PGO opportunities for the computing device by analyzing the whole program profile. The examples of FIG. 4A and FIG. 4B are specifically directed to shader program instrumentation and profiling of a gaming application. FIG. 4A is directed to piecemeal profiling of operand values and FIG. 4B is directed to piecemeal profiling of block executions. Piecemeal profiling can be directed to other areas of interest, also. The principles disclosed in the examples can be extended in a straightforward manner to real application frames with 100s of shaders and to other profiling needs as well. The collection of the piecemeal profiles can be controlled by the driver on each computing device.

In FIG. 4A instrumentation is added to profile values flowing through instructions (selected subset of instructions) for one user computing device and pick a different set of profiles for another user computing device. In this example, instrumentation seeks to determine the probabilities that the results of each of the instructions in the profiled subset are zero. The instrumentation is implemented in the form of code instructions that monitor specific sections of code in the application that are then accumulated in a central database at the server. The instrumentation can be a sequence of instructions that is used to collect desired information. An instrumentation site is a location in the game program where some of the information is to be collected.

In some embodiments, there is no requirement that the chosen subsets of instructions for different users are mutually exclusive. In FIG. 4A, User A and User Z profile the same subset of instructions and the resulting values of the operands contributed can be different. For example, User Z indicates the probability of being zero of the first instruction's result or destination operand is 0% and the probability of the next two instructions' destination operands being zero is 99%. Observed values for the same destination operands on computing device of User A is 90%, 0% and 0% respectively. These percentages are uploaded to the server to be statistically analyzed and for determining if convergence to a stable mean or mode at high confidence is likely. If there is no convergence at the desired high confidence, more piecemeal profiles may be needed. In addition to convergences, aberrations in the data values can be determined.

Site1, site2, and site3 in FIG. 4A refer to three possible instrumentation sites in the loop that is shown. An "instrumentation site" is a location in a program where profiling code (i.e. instrumentation) is added to write out information of interest. 0xab and 0xcd in FIG. 4A refer to different potential context hashes which may be used to tag the collected profiles. In FIG. 4A, dedicated logic, either software or hardware, can be used to control how often the collected values are written to memory.

Instead of operand values, the piecemeal profiling of FIG. 4B is interested in the number of times a program goes through a particular loop or the number of times an IF block is taken. The counting of times is collected relative to program entries. For each of the users A, B, C and Z, Instrument 1 keeps count of the number of times the program is entered and Instrument 2 keeps count of the number of times that a particular site is executed. Thus, a learning or conclusion can be reached for User A that a loop is executed 400 times every time the program is entered. The collected piecemeal profiles are provided to the server for processing. The information is collected relative to program entries as a percentage to enable comparisons of profiles from one user computing device to another. For example, Loop is executed 400 times more than program entry and the IF statement is executed 20 percent of the time of program entry. Using mutual exclusive properties, the ELSE portion can then be inferred to be executed 380 percent of time.

Figure 5:
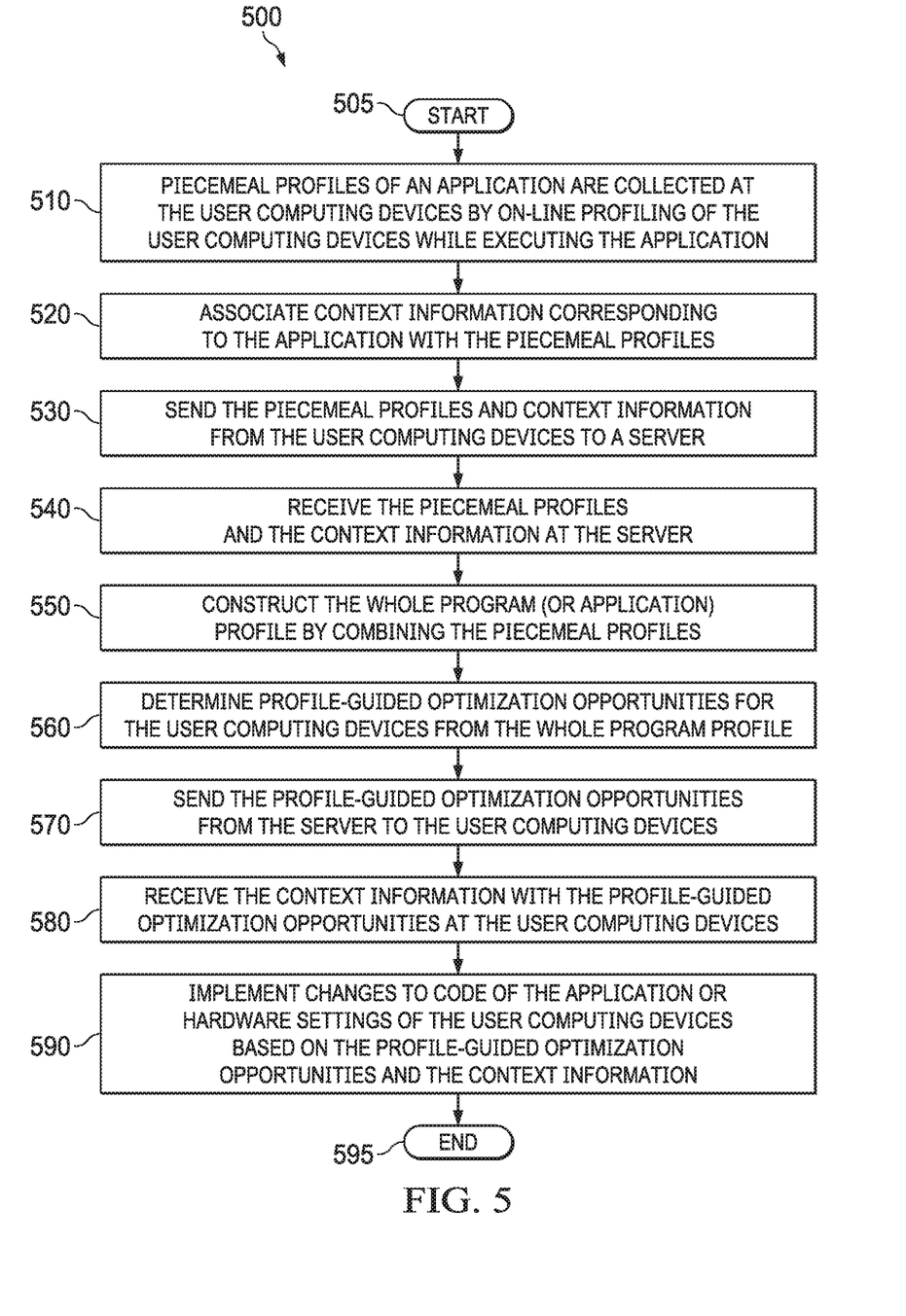
FIG. 5 illustrates a flow diagram of an embodiment of a method of enabling profile-guided optimizations for executing an application on a user computing device carried out according to the principles of the disclosure.

FIG. 5 illustrates a flow diagram of an embodiment of a method 500 of enabling profile-guided optimizations for executing an application on a user computing device carried out according to the principles of the disclosure. The application can be a gaming application. The method 500 or at least parts thereof can be carried out by a DSSP such as disclosed in FIG. 2. A computing device may include the necessary logic circuitry to carry out at least a portion of the method 500. In one embodiment, the method 500 or at least a portion thereof may be embodied as a series of operating instructions that are stored on a non-transitory computer readable medium and used to direct the operation of a processor when initiated thereby. The method 500 begins in a step 505.

In a step 510, piecemeal profiles of a whole program profile for the application are collected at the user computing devices by on-line profiling of the user computing devices while executing the application. The collection can be initiated based on an update of a driver for the application or based on an update of the application. The whole program profile is for multiple instructions of the application and each of the piecemeal profiles are directed to a deterministically or randomly determined subset of the instructions (e.g., a region of code of the application). Since multiple piecemeal profiles can potentially be directed at the same subset of instructions, piecemeal profiles can be normalized to invocation counts of certain marker locations (for example, the first instruction in a computer program). Such normalized piecemeal profiles can then be easily combined to create whole program profiles for an application.

In a step 520, context information corresponding to the application is associated with the piecemeal profiles. The context information is obtained at the user computing devices after executing the application (off-line).

In a step 530, the piecemeal profiles and context information are sent from the user computing devices to a server. The server can be a cloud-based server such as a PGO server. In a step 540, the piecemeal profiles and the context information are received by the server.

In a step 550, the whole program (or application) profile is constructed by combining the piecemeal profiles. Constructing of the whole program profile includes providing a unified view of the application by collating the piecemeal profiles.

In a step 560, PGO opportunities are determined for the user computing devices from the whole program profile. Determining the PGO opportunities can include analyzing the whole program profile for profile-guided optimization opportunities. The PGO opportunities include code transformations for the application, changes in hardware performance settings for the user computer devices, or a combination of both.

In a step 570, the PGO opportunities are sent from the server to the user computing devices. Sending of the PGO opportunities can be based on recent access of the application from the server by the user computing devices. In some embodiments, sending of the PGO opportunities is prevented based on quality assurance concerns related to the application or to the drivers of the application.

In a step 580, the context information with the PGO opportunities are received at the user computing devices. In a step 590, changes to code of the application or hardware settings of the user computing devices based on the PGO opportunities and the context information are implemented. Implementing the changes can be performed after at the next execution of the application. Implementing of the changes can include selectively invalidating disk cache and recompiling the application employing the profile-guided optimization opportunities. The method 500 ends in a step 595.

The disclosure provides an improved profiling and enabling method where in various embodiments a user computer device gathers profile information through random gathering, provides the profile information to a server that creates profiling databases per games (and can be per level of the games), gets confidence/optimizations by analyzing the databases (this can be via conventional processing), sends back down optimization opportunities for implementation at the computing devices.

A portion of the above-described apparatus, systems or methods may be embodied in or performed by various digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Those skilled in the art to which this application relates will appreciate that other and further additions, deletions, substitutions and modifications may be made to the described embodiments.

What is claimed is:

1. A method of enabling profile-guided optimizations, comprising:
   randomly selecting subsets of instructions from one or more targeted regions of one or more frames of an application that provide a sampling of code of the application;
   generating piecemeal profiles from the subsets of instructions during execution of the application on one or more user computing devices;
   receiving the piecemeal profiles from on-line profiling of the application on the one or more user computing devices;
   constructing a program profile for the application by combining the piecemeal profiles, wherein each one of the piecemeal profiles are a portion of the program profile; and
   identifying profile-guided optimization opportunities by analyzing the program profile.

2. The method as recited in claim 1 wherein the frames are periodically selected.

3. The method as recited in claim 1 further comprising normalizing counts of various statistics obtained for the subsets of instructions to the total number of times the corresponding subsets are profiled on the corresponding one of the one or more user computing devices.

4. The method as recited in claim 1 wherein the receiving is performed by a cloud-based server, the method further comprising collecting, at the one or more user computing devices, the piecemeal profiles by the on-line profiling.

5. The method as recited in claim 4 wherein the collecting is initiated based on an update of a driver for the application or based on an update of the application.

6. The method as recited in claim 1 further comprising associating the piecemeal profiles with context information corresponding to the application and receiving the context information with the piecemeal profiles.

7. The method as recited in claim 6 wherein the context information is obtained by the one or more user computing devices after the execution of the application.

8. The method as recited in claim 1 wherein the constructing the program profile includes providing a unified view of the application by collating the piecemeal profiles.

9. The method as recited in claim 1 wherein the generating the piecemeal profiles is on multiple of the user computing devices and the selecting includes selecting different subsets of instructions for different ones of the multiple user computing devices.

10. The method as recited in claim 1 wherein the profile-guided optimization opportunities include code transformations for the application, changes in hardware performance settings for the one or more user computing devices, or a combination of both.

11. The method as recited in claim 1 wherein the receiving is performed by a cloud-based server and the method further comprises sending the profile-guided optimization opportunities from the cloud-based server to the one or more user computing devices.

12. The method as recited in claim 11 further comprising receiving, at the one or more user computing devices, the profile-guided optimization opportunities and implementing changes to the code of the application or hardware settings of the one or more user computing devices based on the profile-guided optimization opportunities.

13. The method as recited in claim 11 further comprising reviewing the profile-guided optimization opportunities for quality before the sending.

14. The method as recited in claim 11 further comprising sending context information with the profile-guided optimization opportunities.

15. The method as recited in claim 14 further comprising receiving the context information with the profile-guided optimization opportunities and implementing changes to the code of the application or hardware settings of the one or more user computing devices based on the profile-guided optimization opportunities and the context information.

16. The method as recited in claim 15, wherein the implementing the changes is performed after the receiving and at the next execution of the application on the one or more user computing devices.

17. The method as recited in claim 15, wherein the implementing the changes includes selectively invalidating disk cache and recompiling the application employing the profile-guided optimization opportunities.

18. The method as recited in claim 1 wherein the application is a gaming application and the frames correspond to rendered images of the gaming application.

19. The method as recited in claim 1 wherein the subsets of instructions generate piecemeal profiles directed to block execution weight profiling of the application or to operand values.

20. A piecemeal profiling system for on-line profiling, comprising:
   a first processor configured to obtain piecemeal profiles of a program profile for an application executing on a user computing device;
   a second processor configured to randomly select subsets of instructions from one or more targeted regions of one or more frames of the application that provide a sampling of code of the application, receive the piecemeal profiles during the on-line profiling, construct the program profile based on the piecemeal profiles, and identify profile-guided optimization opportunities by analyzing the program profile; and
   a third processor configured to receive the profile-guided optimization opportunities and implement changes to the application or hardware settings of the user computing device based on the profile-guided optimization opportunities.

21. The piecemeal profiling system as recited in claim 20 wherein the first processor, the second processor, and the third processor are all located on the user computing device.

22. The piecemeal profiling system as recited in claim 20 wherein at least two of the first processor, the second processor, and the third processor are located on different computing devices.

23. A profile-guided optimization server, comprising:
a communications interface configured to receive and transmit data via a communications system; and
a hardware processor configured to randomly select subsets of instructions from one or more targeted regions of one or more frames of an application that provide a sampling of code of the application, receive piecemeal profiles of the application via the communications interface that are generated from the subsets of instructions during execution of the application on multiple computing devices, construct a program profile for the application based on corresponding piecemeal profiles from the multiple computing devices, and identify profile-guided optimization opportunities for the application by analyzing the program profile.

24. The profile-guided optimization server as recited in claim 23 wherein the application is one of multiple applications and the processor if further configured to deactivate the profile-guided optimization opportunities for one of the multiple applications based on a title of the one of the applications.

* * * * *